May 3, 1932.  L. H. WHEELER  1,856,365
LUBRICANT COMPRESSOR
Filed Jan. 31, 1929
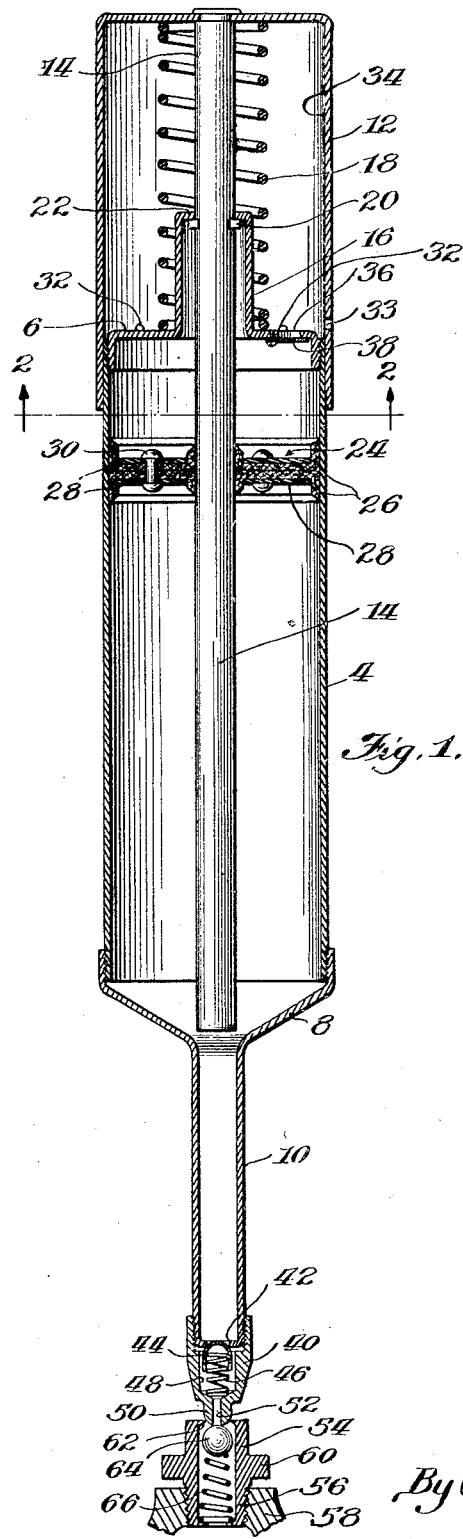
Inventor
Leonard H. Wheeler
By Williams, Bradbury, McCalb & Hinkle
Attys.

Patented May 3, 1932

1,856,365

UNITED STATES PATENT OFFICE

LEONARD H. WHEELER, OF CHICAGO, ILLINOIS, ASSIGNOR TO ALEMITE CORPORATION, OF CHICAGO, ILLINOIS, A CORPORATION OF DELAWARE

LUBRICANT COMPRESSOR

Application filed January 31, 1929. Serial No. 336,409.

My invention relates generally to high pressure lubricating apparatus and more particularly to lubricant compressors adapted to force lubricant into bearings under high pressure. The compressor is of the type in which the coupling connection with the lubricant receiving fitting and the exertion of pressure upon the lubricant are made by pushing the compressor bodily against the lubricant receiving fitting.

It is an object of my invention to provide an improved compressor of the above-mentioned type having pneumatically operated means for forcing the lubricant from the reservoir into the high pressure cylinder.

A further object is to provide an improved lubricant compressor having an improved means for pumping air under pressure into the lubricant reservoir.

A further object is to provide an improved compressor which is simple in construction, which will feed lubricant positively and which may be economically manufactured.

Other objects and advantages will appear from the following description, reference being had to the accompanying drawings, in which Fig. 1 is a central longitudinal sectional view of the compressor applied to a lubricant receiving fitting;

Fig. 2 is a transverse sectional view thereof taken on the line 2—2 of Fig. 1; and Fig. 3 is an enlarged sectional view of the compressor nozzle.

The compressor of my invention comprises a substantially cylindrical barrel 4 having a head 6 threaded in the upper end thereof and a cap 8 formed integrally with a high pressure cylinder 10 threaded at the lower end thereof. A cylindrical cup 12 fits closely around the barrel 4 and has a plunger 14 riveted thereto. The plunger 14 is slidable through the dome-shaped portion 16 of the head 6 and has its lower end spaced a short distance from the upper end of cylinder 10. A spring 18 is compressed between the head 6 and the cup 12, normally holding the latter in the position shown in Fig. 1, the outward movement of the cup being limited by the engagement of ears 20 struck from the plunger 14, with an inwardly turned flange 22 forming part of the dome-shaped portion 16 of the head 6.

A follower 24 comprising a pair of cup leathers 26 having central annular flanged portions sealing around the plunger 14, separates the lubricant from the air in the barrel 4. The cup leathers 26 are held in shape by face plates 28 which are joined by rivets 30.

The cup 12 has a plurality of air inlet ports 32 which, when the cup is in normal position, permit admission of air to the cylindrical chamber 34 within the cup 12. An additional air admission port 33 is spaced slightly above the other ports 32 for a purpose which will hereinafter appear.

The head 6 has a port 36 which is normally closed by a flexible flap valve 38. The lower end of the high pressure cylinder 10 is externally threaded to receive a nozzle 40 and is inwardly flanged at 42 to provide a seat for a check-valve 44. The check-valve is held against the seat by a spring 46 which lies within an enlarged bore 48 in the nozzle. The tip 50 of the nozzle is substantially spherical in shape and has a relatively small discharge opening 52 communicating with the bore 48.

The nozzle is adapted to make a quick lubricant tight connection with a lubricant receiving fitting which may be generally of the type shown in Fig. 1 and may comprise an axially bored body 54 having a screw threaded portion 56 adapted to be screwed into the oil hole of a bearing 58, a hexagonal portion 60, a check valve seat 62, and a ball check-valve and closure 64 held against the seat by a spring 66.

The seat 62 preferably has a fairly sharp edge so as to make practically a line contact with the spherical tip 50 of the nozzle. The compressor nozzle need therefore not be pressed against the fitting in exact axial alignment therewith but may be conveniently applied to the fitting at a substantial angle relative to the axis thereof.

In operation, the barrel 4 is preferably filled with lubricant, grease or oil, by inverting the compressor, removing the cap 8, and forcing the follower 24 toward the head 6. The valve 38 may be moved from its seat by a small hook-shaped piece of wire inserted through the opening 33 so as to permit escape of the air confined between the follower and the head. After the barrel 4 has been completely filled with lubricant the cap 8 is tightly screwed on the barrel and the compressor is ready for operation.

The compressor is forced against the lubricant receiving fitting in the position shown in Fig. 1, by pushing at the upper end of the cup 12. Upon the application of pressure to the cup it will telescope over the barrel 4 and the ports 32, 33 will be covered. Further telescoping movement of the cup compresses the air confined within the cup and forces it through the port 36 past the check valve 38 into the space between head 6 and the follower 24. The pressure of the compressed air above the follower 24 tends to move the latter downwardly, placing the lubricant within the barrel 4 under pressure.

As the cup 12 is moved relative to the barrel 4 it carries with it the plunger 14, the lower end of which enters the cylinder 10 and forces the lubricant therein under high pressure past the check-valve 44 into the lubricant receiving fitting. Upon slightly relieving the manual pressure applied against the cup 12 the spring 18 will move the cup 12 and plunger 14 upwardly relative to the barrel 4 and withdraw the plunger from the cylinder.

Upon upward telescoping movement of the cup relative to the barrel 4 a partial vacuum is created within the cup. This partial vacuum is, however, relieved as soon as the ports 32, 33 clear the end of the barrel 4. The pressure on the air between the follower and head 6 is, however, maintained and forces lubricant from the barrel 4 into the high pressure cylinder 10 to prime the latter for the next operative stroke. As the plunger 14 is withdrawn from the cylinder the check-valve 42 of course operates to prevent admission of air into the cylinder 10.

From the above description, it will appear that I have provided an extremely simple compressor which operates very satisfactorily to force lubricant under high pressure into lubricant receiving fittings. The operation of the compressor is accomplished by a simple manual thrust which not only expels the lubricant under pressure but operates what might be termed a small air compressor to build up pneumatic pressure behind the follower in the barrel or low pressure cylinder.

The invention is capable of wide variation within equivalent limits and I contemplate such variation as may be desirable or useful in the particular adaptation of the invention shown, or in its adaptation to other devices. I do not restrict myself in any unessential particulars, but what I claim and desire to secure by Letters Patent is:

1. A high pressure lubricant compressor comprising a barrel, a high pressure cylinder secured at the end of said barrel, a follower in said barrel, a plunger passing through said follower adapted to operate in said high pressure cylinder, and means attached to said plunger for manually applying a pneumatic pressure behind said follower.

2. In a device of the class described, the combination of a high pressure cylinder, a low pressure cylinder having a piston follower therein, a plunger operable in said high pressure cylinder, a pumping mechanism associated therewith for forcing air under pressure behind said follower, and common manually operable means for actuating said pumping mechanism and said plunger by thrusting the compressor bodily against a lubricant receiving fitting.

3. In a device of the class described, the combination of a barrel, a high pressure cylinder and a nozzle, said barrel, cylinder and nozzle being in axial alignment, a plunger operable in said high pressure cylinder, a follower piston in said barrel, and means operable upon manually forcing said nozzle against a lubricant receiving fitting to force air under pressure behind said follower piston and move said plunger into said barrel.

4. In a device of the class described, the combination of a cylindrical barrel, high pressure lubricant expelling means at one end thereof, a head closing the other end thereof, an inwardly opening check-valve in said head, a cup adapted to telescope over said last-named end of said barrel, said cup arranged to force air under pressure past said check-valve, and a mechanical connection between said cup and said high pressure expelling means.

5. A high pressure lubricant compressor comprising a lubricant container, a high pressure cylinder secured at the end of said container, a movable wall in said container, a plunger adapted to operate in said high pressure cylinder, and means rigidly attached to said plunger for applying a pneumatic pressure on one side of said movable wall, said last-named means being positioned relative to said container to exert pressure upon the lubricant in said container during a forward thrust movement of the compressor against a lubricant receiving fitting.

6. A high pressure lubricant compressor comprising a barrel, a high pressure cylinder, and a nozzle, said barrel, cylinder and nozzle being in axial alignment, a plunger operable in said high pressure cylinder, a follower in said barrel, and an air compressor operable upon manually forcing said compressor nozzle against a lubricant receiving fitting to force air under pressure into said barrel.

7. In a device of the class described, the combination of a cylindrical barrel, a high pressure cylinder at one end thereof, a head closing the other end thereof, an inwardly opening check-valve in said head, a manually operable plunger in said cylinder, and a cup secured to said plunger and adapted to telescope over said last-named end of said barrel, said cup forming an air compression chamber for forcing air under pressure past said check-valve.

8. A high pressure lubricant compressor comprising a barrel, a high pressure cylinder, a nozzle, said barrel, cylinder and nozzle being in axial alignment, a manually operable plunger in said high pressure cylinder, a follower in said barrel, a cup-shaped member mounted for telescoping movement over the end of said barrel and secured to said plunger, said member having an opening closed by telescoping movement of said member toward said barrel, and a check valve for admitting air from within said member to said barrel.

9. In a device of the class described, the combination of a low pressure cylinder having a piston therein, a high pressure cylinder communicating with said low pressure cylinder, a plunger operable in said high pressure cylinder, an air compressor mechanism associated with said low pressure cylinder and having an operative element movable relative thereto, said mechanism being arranged to force air into said low pressure cylinder, and a common spring for operating said mechanism and said plunger upon their respective return strokes.

In witness whereof, I hereunto subscribe my name this 25th day of January, 1929.

LEONARD H. WHEELER.